United States Patent
Edwards et al.

(10) Patent No.: US 7,948,293 B1
(45) Date of Patent: May 24, 2011

(54) SYNCHRONIZING TRANSITIONS BETWEEN VOLTAGE SOURCES USED TO PROVIDE A SUPPLY VOLTAGE

(75) Inventors: Eric E. Edwards, Albuquerque, NM (US); Phillip A. Young, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 80 days.

(21) Appl. No.: 12/360,260

(22) Filed: Jan. 27, 2009

(51) Int. Cl.
*H03L 5/00* (2006.01)

(52) U.S. Cl. ......................................................... 327/333

(58) Field of Classification Search .................. None
See application file for complete search history.

(56) References Cited

U.S. PATENT DOCUMENTS

| | | | | |
|---|---|---|---|---|
| 6,856,173 B1 * | 2/2005 | Chun | ............................. | 326/108 |
| 6,879,190 B2 * | 4/2005 | Kim et al. | ...................... | 327/108 |
| 7,414,442 B2 * | 8/2008 | Uno | ............................... | 327/112 |
| 2001/0011917 A1 * | 8/2001 | Kim et al. | ...................... | 327/333 |
| 2008/0284486 A1 * | 11/2008 | Im | ................................. | 327/333 |

* cited by examiner

*Primary Examiner* — Lincoln Donovan
*Assistant Examiner* — Khareem E Almo
(74) *Attorney, Agent, or Firm* — Terry W. Forsythe; Kevin T. Cuenot; LeRoy D. Maunu

(57) ABSTRACT

A method of synchronizing transitions between voltage sources that are used to provide a supply voltage. A first control signal ($CS_{clamp}$) that indicates whether to initiate a first transition from a first voltage source to a second voltage source to provide the supply voltage ($V_{gg}$). When the first control signal indicates to initiate a first transition from a first voltage source to a second voltage source to provide the supply voltage, the first voltage source can be deactivated from providing the supply voltage. In addition, the first voltage source can be pre-biased with a voltage pre-bias to facilitate a second transition from the second voltage source to the first voltage source. Further, the second voltage source can be activated to provide the supply voltage.

20 Claims, 4 Drawing Sheets

SYNCHRONIZING TRANSITIONS BETWEEN VOLTAGE SOURCES USED TO PROVIDE A SUPPLY VOLTAGE

FIELD OF THE INVENTION

The embodiments disclosed herein relate to voltage control in an integrated circuit. More particularly, the embodiments relate to the use of a plurality of voltage sources when providing a supply voltage.

BACKGROUND

Modern integrated circuits (ICs) oftentimes utilize a plurality of voltage sources to provide power to various integrated circuit components. In certain circumstances, it may be advantageous to selectively utilize more than one of these voltage sources to provide a supply voltage for certain IC components, depending on the current power requirements of the component. For instance, a voltage $V_{cc}Aux$ may be used to provide a supply voltage $V_{gg}$ to a memory cell array during normal operation, and a voltage $V_{dd}$ may be used to provide the supply voltage $V_{gg}$ during a power saving mode in which the number of reads and writes to the memory cell array are minimal.

Even though the voltage level of $V_{cc}Aux$ may be higher than that required for the memory cell array, a power supply regulator can be used to generate the appropriate supply voltage $V_{gg}$ from $V_{cc}Aux$. Moreover, the higher voltage level of $V_{cc}Aux$ provides margin for the power supply regulator to dynamically compensate for voltage drops which often occur when heavy current loads are encountered. Thus $V_{cc}Aux$ can be used to maintain the voltage level of the supply voltage $V_{gg}$ relatively constant, even when the load current varies.

By comparison, if the voltage source $V_{dd}$ is used to provide the supply voltage $V_{gg}$, and the nominal voltage level of $V_{dd}$ is that which is required of the supply voltage $V_{gg}$, power regulation need not be applied to the voltage $V_{dd}$. Thus, the use of the voltage $V_{dd}$ to provide the supply voltage $V_{gg}$ can be more energy efficient than using $V_{cc}Aux$ and a power regulator. Notwithstanding, the voltage $V_{dd}$ may not be suitable when the load current is high. For example, a high level of load current may result in a voltage drop that causes the supply voltage $V_{gg}$ to fall below a suitable voltage level.

SUMMARY

The embodiments disclosed herein relate to a method of synchronizing transitions between voltage sources that are used to provide a supply voltage. The method can include receiving a control signal that indicates whether to initiate a first transition from a first voltage source to a second voltage source to provide the supply voltage. When the control signal indicates to initiate a first transition from a first voltage source to a second voltage source to provide the supply voltage, the first voltage source can be deactivated from providing the supply voltage. In addition, the first voltage source can be pre-biased with a voltage pre-bias to facilitate a second transition from the second voltage source to the first voltage source. Further, the second voltage source can be activated to provide the supply voltage.

Deactivating the first voltage source from providing the supply voltage can include turning off a voltage driver of the first voltage source. Turning off the voltage driver of the first voltage source can include decoupling a gate of the voltage driver from a bias voltage and coupling the gate of the voltage driver to a voltage that is different from the bias voltage.

The method further can include disabling at least one current sink from sinking current from the supply voltage. Additionally or alternatively, a bias voltage generated by a power supply regulator of the first voltage source can be reduced to a voltage level that is between a level of a common voltage and 0V. For example, the bias voltage can be reduced to a voltage level that is equal to the level of the common voltage minus a voltage that is approximately equal to a voltage drop across a diode.

When the control signal indicates to initiate a second transition from the second voltage source to the first voltage source to provide the supply voltage, the second voltage source can be deactivated from providing the supply voltage and the first voltage source can be activated to provide the supply voltage. In addition, the voltage pre-bias can be applied to a voltage driver of the first voltage source to provide a suitable bias voltage for the voltage driver to maintain the supply voltage during the transition from the second voltage source to the first voltage source. A gate of the voltage driver can be decoupled from a voltage that is different from the bias voltage. Further, at least one current sink can be enabled to sink current from the supply voltage.

Another embodiment of the present invention includes a voltage synchronization system. The voltage synchronization system can include a first voltage source, a second voltage source, a transmission gate, and a level shifter that receives a first control signal that indicates whether to initiate a first transition from the first voltage source to the second voltage source to provide the supply voltage. When the first control signal indicates to initiate the first transition from the first voltage source to the second voltage source to provide the supply voltage, the level shifter can generate at least one control signal. The control signal can be coupled to the transmission gate that deactivates the first voltage source from providing the supply voltage, and can pre-bias the first voltage source with a voltage pre-bias to facilitate a second transition from the second voltage source to the first voltage source. The transmission gate can deactivate the first voltage source by turning off a voltage driver of the first voltage source. The level shifter also can couple the at least one control signal to the second voltage source to activate the second voltage source to provide the supply voltage.

The voltage synchronization system further can include a switch that, in response to the at least one control signal, couples a gate of the voltage driver to a voltage that is different from a bias voltage. The transmission gate can turn off the voltage driver of the first voltage source by decoupling the gate of the voltage driver from the bias voltage. The voltage synchronization system also can include at least one switch that, in response to the at least one control signal, disables at least one current sink from sinking current from the supply voltage.

The first voltage source can include a power supply regulator and a voltage divider network that, in response to the at least one control signal, reduces a bias voltage generated by the power supply regulator to a voltage level that is between a level of a common voltage and 0V. For example, the voltage divider network can reduce the bias voltage to a voltage level that is equal to the level of the common voltage minus a voltage that is approximately equal to a voltage drop across a diode.

When the first control signal indicates to initiate a second transition from the second voltage source to the first voltage source to provide the supply voltage, the level shifter can couple the at least one control signal to the second voltage source to deactivate the second voltage source from providing the supply voltage. The level shifter also can couple the at least one control signal to the transmission gate to activate the first voltage source to provide the supply voltage, and to apply the voltage pre-bias to a voltage driver of the first voltage source to provide a suitable bias voltage for the voltage driver to maintain the supply voltage during the second transition from the second voltage source to the first voltage source.

The voltage synchronization system also can include a switch that, in response to the at least one control signal, decouples a gate of the voltage driver from a voltage that is different from the bias voltage. In addition, the voltage divider network can reduce the bias voltage to a voltage level that is equal to the level of the common voltage minus a voltage that is approximately equal to a voltage drop across a diode.

Yet another embodiment of the present invention can include a voltage synchronization system which includes a first voltage source, a second voltage source, a transmission gate, and a level shifter that receives a first control signal that indicates whether to initiate a transition from the second voltage source to the first voltage source to provide the supply voltage. When the first control signal indicates to initiate the transition from the second voltage source to the first voltage source to provide the supply voltage, the level shifter can generate at least one control signal that is coupled to the second voltage source to deactivate the second voltage source from providing the supply voltage. The level shifter also can couple the at least one control signal to the transmission gate to activate the first voltage source to provide the supply voltage and to apply a voltage pre-bias to a voltage driver of the first voltage source to provide a suitable bias voltage for the voltage driver to maintain the supply voltage during the transition from the second voltage source to the first voltage source. The voltage synchronization system further can include a switch that, in response to the at least one control signal, disables at least one current sink that sinks current from the supply voltage.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to a voltage synchronization system that synchronizes transitions between voltage sources that are used to provide a supply voltage to components of an integrated circuit (IC). More particularly, the voltage synchronization system is configured to maintain a suitable voltage level for the supply voltage during the transition. The voltage synchronization system also prevents current generated by a first voltage source from flowing to a second voltage source during the transition, thereby avoiding voltage fluctuations in the second voltage source that otherwise may occur. Moreover, the voltage synchronization system also can pre-bias the first voltage source to facilitate a transition from the second voltage source back to the first voltage source.

One example of an IC to which the present embodiments may be applied is a field programmable gate array (FPGA), although the invention is limited in this regard. Indeed, the embodiments described herein can be applied to any other ICs that may transition between different voltage sources to provide a supply voltage, including other types of programmable logic devices (PLDs).

Figure 1:
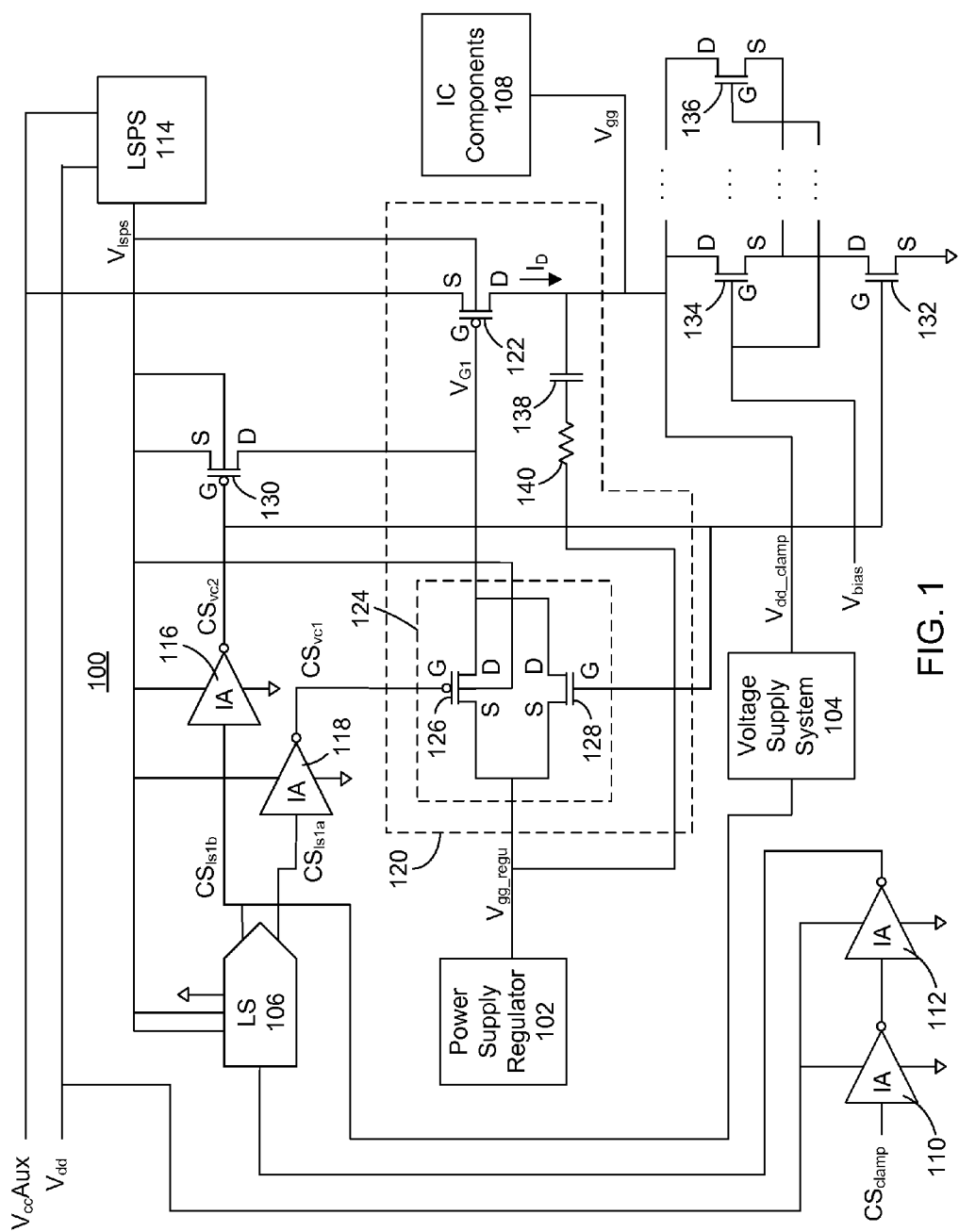
FIG. 1 is a first schematic diagram illustrating a voltage synchronization system which is useful for understanding the embodiments disclosed herein.

FIG. 1 is a first schematic diagram illustrating a voltage synchronization system (hereinafter "system") 100 which is useful for understanding the embodiments disclosed herein. The system 100 can include a level shifter 106. The level shifter 106 can receive a control signal $CS_{clamp}$ which indicates a type of voltage that is to be used by the system 100 to generate a supply voltage $V_{gg}$. For example, the control signal $CS_{clamp}$ can indicate whether a common voltage $V_{cc}Aux$ provided by a power supply regulator 102 is to be used to generate the voltage $V_{gg}$, or a clamped voltage $V_{dd\_clamp}$ provided by a voltage supply system 104 is to be used to generate the supply voltage $V_{gg}$.

The supply voltage $V_{gg}$ can be provided to IC circuit components 108. In one embodiment, the IC circuit components 108 can include a memory cell array. The IC components also can include any other components of the IC, or components that are otherwise coupled to the IC, which may operate using the voltage $V_{gg}$.

The control signal $CS_{clamp}$ can be coupled to the level shifter 106 via one or more inverters 110, 112, which may buffer the level shifter 106 from the source of the control signal $CS_{clamp}$. In illustration, the inverters 110, 112 can be cascaded so as to provide the control signal $CS_{clamp}$ to the level shifter 106 with the same polarity at which the control signal $CS_{clamp}$ is received. In another embodiment, the control signal $CS_{clamp}$ can be provided to the level shifter 106 with a polarity that is opposite of the polarity at which the control signal $CS_{clamp}$ was received. In yet another embodiment, one or more buffers or additional inverters may be used to couple the control signal $CS_{clamp}$ to the level shifter 106.

The level shifter 106 also can receive a voltage $V_{lsps}$ from a level shifter power supply 114. The voltage $V_{lsps}$ can be approximately equal to the voltage $V_{cc}Aux$ or a supply common voltage $V_{dd}$, whichever is greater. Thus, if one of the voltages $V_{cc}Aux$, $V_{dd}$ is turned off, the voltage $V_{lsps}$ still may be generated. Accordingly, the level shifter 106, as well as any other components that operate using the voltage $V_{lsps}$, can continue to function. Notwithstanding that the level shifter 106 can receive the voltage $V_{lsps}$ from a level shifter power supply 114, the level shifter also may receive additional supply voltages. For example, the level shifter 106 also can receive the voltage $V_{dd}$, for example as a voltage source for certain control modules within the level shifter 106.

The level shifter 106 can generate control signals $CS_{ls1a}$, $CS_{ls1b}$ that correspond to the control signal $CS_{clamp}$. The control signals $CS_{ls1a}$, $CS_{ls1b}$ can be complementary to one another. In other words, when $CS_{ls1a}$ is high (e.g., approximately equal to the voltage $V_{lsps}$), $CS_{ls1b}$ can be low (e.g., approximately 0V). Similarly, when $CS_{ls1a}$ is low, $CS_{ls1b}$ can be high. By way of example, when the control signal $CS_{clamp}$ indicates that the voltage $V_{cc}Aux$ is to be used to generate the supply voltage $V_{gg}$, the control signal $CS_{ls1a}$ can be set high and the control signal $CS_{ls1b}$ can be set low. Similarly, when the control signal $CS_{clamp}$ indicates that the voltage $V_{dd\_clamp}$ is to be used to generate the supply voltage $V_{gg}$, the control signal $CS_{ls1a}$ can be set low and the control signal $CS_{ls1b}$ can be set high.

In one embodiment, the circuit 100 can include inverters 116, 118 that couple the control signals $CS_{ls1a}$, $CS_{ls1b}$ to other components of the system 100, for example to a transmission gate 124. The inverters 116, 118 also can buffer the level shifter 106 from other components of the system 100. However, control signal $CS_{ls1b}$ can be coupled to voltage supply system 104 without traversing inverter 116.

The control signals $CS_{vc1}$, $CS_{vc2}$ can be coupled to a regulated voltage circuit 120. The regulated voltage circuit 120 also can receive a bias voltage $V_{gg\_regu}$ from a power supply regulator 102 and selectively couple the bias voltage $V_{gg\_regu}$ to voltage driver 122. In one embodiment, the voltage driver 122 can be a p-channel MOSFET (PMOS) transistor. In another embodiment, the voltage driver 122 can be an n-channel MOSFET (NMOS) transistor. Still, any other suitable transistors or other voltage sources may be used and the invention is not limited in this regard. Accordingly, when references to gates, sources, and drains are indicated within this specification, it will be appreciated that the inventive arrangements are not limited to these specific structures, and that other structures may be used. For instance, a bipolar junction transistor (BJT) comprises a base, a collector and an emitter, and the use of BJTs are within the scope of the present invention. Moreover, in accordance with the descriptions provided herein, those skilled in the art will appreciate changes to the control signals that may be implemented to accommodate different types of transistors. For example, if an NMOS transistor is used in lieu of a PMOS transistor, the polarity of the control signal applied to the gate of such transistor can be reversed. In this regard, circuit components that provide the control signals can be changed, added or deleted.

The regulated voltage circuit 120 can couple the bias voltage $V_{gg\_regu}$ to a gate of the voltage driver 122 as a bias voltage $V_{G1}$. A source of the voltage driver 122 can be coupled to a supply common voltage, for example the voltage $V_{cc}Aux$, and a drain of the voltage driver 122 can be coupled to the IC components 108. In an embodiment in which the voltage driver 122 is a PMOS transistor, the voltage $V_{lsps}$ generated by the level shifter power supply 114 can be applied to the voltage driver 122 to suitably bias a well of the voltage driver 122. The voltage $V_{lsps}$ also can be used to bias wells of other transistors in the system 100, as will be described.

When the control signal $CS_{clamp}$, and thus the control signals $CS_{VC1}$, $CS_{VC2}$, indicates that the voltage $V_{cc}Aux$ is to be used to generate the voltage $V_{gg}$, the bias voltage $V_{gg\_regu}$ can bias the voltage driver 122 to generate a desired supply voltage $V_{gg}$. In this regard, the power supply regulator 102 and the voltage driver 122 can form a voltage source that, when activated, supplies the voltage $V_{gg}$.

A transmission gate 124 can be provided in the regulated voltage circuit 120 to selectively control coupling and decoupling of the bias voltage $V_{gg\_regu}$ to the gate of the voltage driver 122 in response to the control signals $CS_{VC1}$, $CS_{VC2}$. In illustration, the transmission gate 124 can include a switch 126 and a switch 128. In one embodiment, the switch 126 can be a PMOS transistor and the switch 128 can be an NMOS transistor. In another embodiment, the switch 126 can be an NMOS transistor and the switch 128 can be a PMOS transistor. In yet another embodiment, both of the switches 126, 128 can be NMOS transistors or PMOS transistors. Still, the switches 126, 128 can comprise any other suitable components that can operate as switches and the invention is not limited in this regard.

The respective switches can be coupled to the bias voltage $V_{gg\_regu}$. For example, in an embodiment in which the switches 126, 128 are transistors, the sources of the respective switches 126, 128 can be coupled to the bias voltage $V_{gg\_regu}$, and the drains of the respective switches 126, 128 can be coupled to the gate of the voltage driver 122. Further, the control signal $CS_{VC1}$ can be coupled to a gate of the switch 126 and the control signal $CS_{VC2}$ can be coupled to a gate of the switch 128. In an embodiment in which the switch 126 is a PMOS transistor, a well of the switch 126 can be biased by the voltage $V_{lsps}$.

The control signals $CS_{VC1}$, $CS_{VC2}$ can bias the respective switches 126, 128 to selectively turn on the switches 126, 128, and thus the transmission gate 124, when it is desired to turn on the voltage driver 122. When the switches 126, 128 are turned on, the switches 126, 128 can couple the gate of the voltage driver to the bias voltage $V_{gg\_regu}$, which can bias the voltage driver 122 for turn on. The control signals $CS_{VC1}$, $CS_{VC2}$ also can bias the respective switches 126, 128 to selectively turn off the switches 126, 128, and thus the transmission gate 124, when it is desired to decouple the bias voltage $V_{gg\_regu}$ from the voltage driver 122, which can turn off the voltage driver 122.

In addition, the control signal $CS_{VC2}$ can be applied to a gate of a transistor 130 to selectively turn on and turn off the transistor 130, which also can be a PMOS transistor, an NMOS transistor, or any other suitable type of transistor. For example, the control signal $CS_{VC2}$ can turn off the transistor 130 when the switches 126, 128 are turned on, and the control signal $CS_{VC2}$ can turn on the transistor 130 when the switches 126, 128 are turned off. A source of the transistor 130 can be coupled to the voltage $V_{lsps}$, and a drain of the transistor 130 can be coupled to the gate of the voltage driver 122. In an embodiment in which the transistor 130 is a PMOS transistor, the voltage $V_{lsps}$ can be coupled to the transistor 130 to bias its well.

When the transistor 130 is turned off, the drain of the transistor 130 can remain at the voltage $V_{G1}$ of the gate of the voltage driver 122, for example at the potential of the bias voltage $V_{gg\_regu}$. When the transistor 130 is turned on, however, the drain of the transistor 130 can couple the gate of the voltage driver 122 to the voltage $V_{lsps}$, which is different (e.g., higher) than the voltage that is suitable for properly biasing the voltage driver 122, thereby turning off the voltage driver 122. Turning off the voltage driver 122 deactivates the voltage driver 122 (and the power supply regulator 102) from being the voltage source for the supply voltage $V_{gg}$.

The control signal $CS_{VC2}$ also can be coupled to a switch 132. In an arrangement in which the switch 132 is an NMOS transistor, a source of the switch 132 can be coupled to a suitable ground, and a drain of the switch 132 can be coupled to one or more current sinks 134, 136, which also may be implemented as transistors. For example, the drain of the switch 132 can be coupled to sources of the current sinks 134, 136. The gates of the current sinks 134, 136 can be coupled to a suitable bias voltage $V_{bias}$, and the drains of the current sinks 134, 136 can be coupled to the supply voltage $V_{gg}$. In this regard, the current sinks 134, 136 can sink current from the supply voltage $V_{gg}$ in order to maintain the current $I_D$ provided by the voltage driver 122 within a range suitable for the voltage driver 122 to maintain the supply voltage $V_{gg}$ within an applicable tolerance. Again, the switch 132 can comprise an NMOS transistor, a PMOS transistor, or any other suitable component(s) that can operate as switches and the invention is not limited in this regard. Further, the current sinks 134, 136 can be PMOS transistors, NMOS transistors, or any other suitable components that suitably sink current.

In contrast to the voltage driver 122, the voltage $V_{dd\_clamp}$ may not need the current sinks 134, 136 to sink current in order to maintain the supply voltage $V_{gg}$ within an applicable tolerance. Thus, when the control signal $CS_{clamp}$ indicates that the voltage supply system 104 is to be activated to provide the supply voltage $V_{gg}$, the control signal $CS_{VC2}$ can turn off the switch 132, which decouples the current sinks 134, 136 from ground, thereby disabling the current sinks 134, 136 from sinking current from the supply voltage $V_{gg}$. When the control signal $CS_{clamp}$ indicates that the voltage supply regulator 102 is to be activated to provide the supply voltage $V_{gg}$, the control signal $CS_{VC2}$ can turn on the switch 132, which couples the current sinks 134, 136 to ground, thus enabling the current sinks 134, 136 to sink current from the supply voltage $V_{gg}$. Advantageously, this embodiment can significantly reduce the power losses within the IC when the voltage supply system 104 is activated to provide the supply voltage $V_{gg}$, which improves the IC efficiency, reduces operating temperatures, and so on.

Referring again to the regulated voltage circuit 120 of FIG. 1, a capacitor 138 can couple the bias voltage $V_{gg\_regu}$ to the drain of the voltage driver 122. In one embodiment, the capacitor 138 can be implemented using a transistor, for example a PMOS transistor, though this need not be the case. In addition, a resistor 140 can be coupled in series with the capacitor 138 between the source of the bias voltage $V_{gg\_regu}$ and the capacitor 138.

Figure 2:
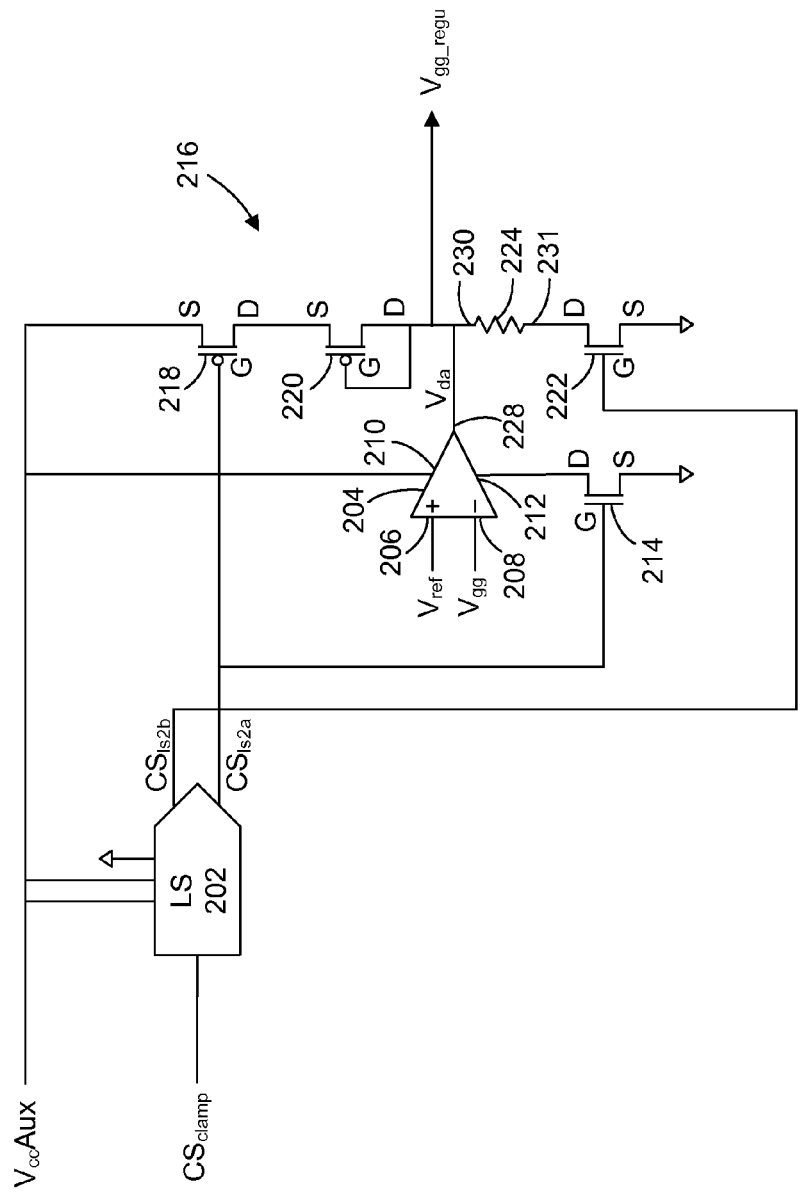
FIG. 2 is a second schematic diagram illustrating a voltage synchronization system which is useful for understanding the embodiments disclosed herein.
Figure 3:
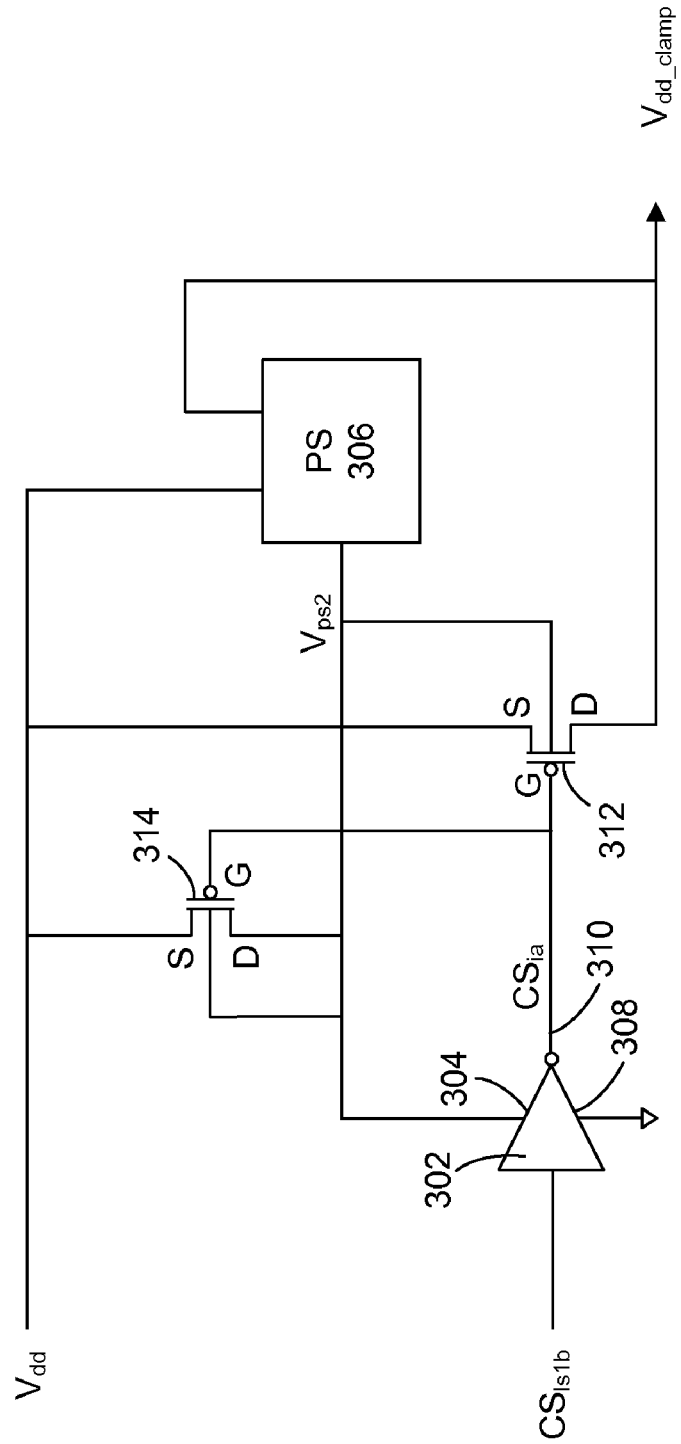
FIG. 3 is a third schematic diagram illustrating a voltage supply system which is useful for understanding the embodiments disclosed herein.

In order to fully appreciate the benefits provided by the capacitor 138 and the resistor 140, the power supply regulator 102 of FIG. 2 and the voltage supply system 104 of FIG. 3 should be understood. Hence, the discussion now will proceed to FIGS. 2 and 3, and subsequently return to FIG. 1 to complete the discussion of the system 100.

FIG. 2 is a second schematic diagram illustrating an example embodiment of the power supply regulator 102, which is useful for understanding the arrangements disclosed herein. As noted, the power supply regulator can supply the bias voltage $V_{gg\_regu}$ to the system 100 of FIG. 1. The power supply regulator 102 can include a level shifter 202. The level shifter 202 can receive the control signal $CS_{clamp}$ which indicates a type of voltage that is to be used to generate a supply voltage $V_{gg}$. The level shifter 202 also can be coupled to the voltage $V_{cc}Aux$, which can provide power for operation of the level shifter 202.

The level shifter 202 can generate control signals $CS_{ls2a}$, $CS_{ls2b}$ that correspond to the control signal $CS_{clamp}$. The control signals $CS_{ls2a}$, $CS_{ls2b}$ can be complementary to one another. When the control signal $CS_{clamp}$ indicates that the voltage $V_{cc}Aux$ is to be used to generate the supply voltage $V_{gg}$, the control signal $CS_{ls2a}$ can be set high and the control signal $CS_{ls2b}$ can be set low. Likewise, when the control signal $CS_{clamp}$ indicates that the voltage $V_{dd\_clamp}$ is to be used to generate the supply voltage $V_{gg}$, the control signal $CS_{ls2a}$ can be set low and the control signal $CS_{ls2b}$ can be set high.

The power supply regulator 102 also can include a differential amplifier 204. A non-inverting input 206 of the differential amplifier 204 can be coupled to a voltage reference $V_{ref}$, which indicates the desired output voltage $V_{da}$ of the differential amplifier 204. An inverting input 208 of the differential amplifier 204 can be coupled to the supply voltage $V_{gg}$. A positive power input 210 of the differential amplifier 204 can be coupled to the voltage $V_{cc}Aux$. Further, a negative power input 212 can be coupled to a transistor 214. The transistor 214 can be a PMOS transistor, an NMOS transistor, or any other suitable transistor. In the present example, the transistor 214 is an NMOS transistor having a gate coupled to the control signal $CS_{ls2a}$, a drain coupled to the negative power input 212 of the differential amplifier 204, and a source coupled to a suitable ground.

The power supply regulator 102 further can include a voltage divider network 216. The voltage divider network 216 can include a transistor 218, a transistor 220 and a transistor 222. The transistors 218-222 also can be PMOS transistors, NMOS transistors, or any other suitable transistors. For example, the transistors 218, 220 can be PMOS transistors and the transistor 222 can be an NMOS transistor. The voltage divider network 216 further can include one or more resistors 224.

A gate of the transistor 218 can be coupled to the control signal $CS_{ls2a}$ and a source of the transistor 218 can be coupled to the voltage $V_{cc}Aux$. A drain of the transistor 218 can be coupled to a source of the transistor 220. A drain of the transistor 220 can be coupled to an output 228 of the differential amplifier 204, and thus receiving the voltage $V_{da}$. The gate of the transistor 220 also can be coupled to a first port 230 of the resistor 224. As such, the transistor 220 can be configured as a diode. Alternatively, a diode can be implemented in the voltage divider network 216 in lieu of the transistor 220. Further, a drain of the transistor 222 can be coupled to a second port 231 of the resistor 224 and a source of the transistor 222 can be coupled to a suitable ground. A gate of the transistor 222 can be coupled to the control signal $CS_{ls2b}$.

When the control signal $CS_{clamp}$ indicates that the voltage $V_{cc}Aux$ is to be used to generate the supply voltage $V_{gg}$, the control signal $CS_{ls2a}$ can be set high, thereby turning off the transistor 218 and turning on the transistor 214. Similarly, the control signal $CS_{ls2b}$ can be set low, thus turning off the transistor 222. As a result of turning on the transistor 214, the differential amplifier 204 can be turned on, thereby generating the voltage $V_{da}$. Because the transistors 218, 222 are turned off, the voltage $V_{da}$ can be output as the bias voltage $V_{gg\_regu}$. In addition, power losses introduced by the voltage divider network 216 can be mitigated in this mode, because the voltage divider network 216 will be turned off.

When the control signal $CS_{clamp}$ indicates that the voltage $V_{dd\_clamp}$ is to be used to generate the supply voltage $V_{gg}$, the control signal $CS_{ls2a}$ can be set low, thereby turning on the transistor 218 and turning off the transistor 214. Similarly, the control signal $CS_{ls2b}$ can be set high, thus turning on the transistor 222. In consequence of turning off the transistor 214, the differential amplifier 204 can be turned off. Accordingly, any power losses introduced by the differential amplifier 204 can be mitigated and the voltage $V_{da}$ will not affect the bias voltage $V_{gg\_regu}$.

When the transistors 218, 222 are turned on, the bias voltage $V_{gg\_regu}$ can be reduced to a value between $V_{cc}Aux$ and 0V. For example, the bias voltage $V_{gg\_regu}$ can be reduced to a voltage level that is approximately equal to the voltage $V_{cc}Aux$ minus the level of the voltage drop across the transistor 220 which, as noted, can be configured as a diode.

Accordingly, the voltage drop across the transistor can be about 0.7V-0.8V, which is approximately equal to the voltage drop across a diode. The resistor 224 can limit the amount of current that flows from $V_{cc}$Aux to ground across the voltage divider network 216 to stabilize the bias voltage $V_{gg\_regu}$ and minimize power losses in the voltage divider network 216.

FIG. 3 is a third schematic diagram illustrating an example embodiment of the voltage supply system 104, which is useful for understanding the arrangements disclosed herein. As noted, the voltage supply system 104 can supply the voltage $V_{dd\_clamp}$ to the system 100 of FIG. 1. As such, when activated the voltage supply system 104 can be used as a voltage source for the supply voltage $V_{gg}$. The voltage supply system 104 can include an inverter 302 which receives the control signal $CS_{ls1b}$ from the level shifter 106 of FIG. 1, and outputs a control signal $CS_{ia}$. A positive power input 304 of the inverter 302 can be coupled to a power supply 306 to receive a voltage $V_{ps2}$, and a negative power input 308 can be coupled to a suitable ground.

The voltage supply system 104 also can include a transistor 312 and a transistor 314. Again, the transistors 312, 314 can be PMOS transistors, NMOS transistors, or any other suitable transistors. A gate of the transistor 312 can be coupled to an output 310 of the inverter 302 so as to receive the control signal $CS_{ia}$ from the inverter 302. A source of the transistor 312 can be coupled to the voltage $V_{dd}$, and a drain of the transistor can provide the voltage $V_{dd\_clamp}$. In an arrangement in which the transistor 312 is a PMOS transistor, the voltage $V_{ps2}$ can be coupled to the transistor 312 to bias the well.

A gate of the transistor 314 also can be coupled to the output 310 of the inverter 302 in order to receive the control signal $CS_{ia}$ from the inverter 302. A source of the transistor 314 can be coupled to the voltage $V_{dd}$, and a drain of the transistor 314 can be coupled to the voltage $V_{ps2}$. In an embodiment in which the transistor 314 is a PMOS transistor, the voltage $V_{ps2}$ can be coupled to the transistor 314 to bias the well. In this regard, the transistor 314 can be configured as a rectifier transistor.

Further, the power supply 306 can be coupled to the voltage $V_{dd}$ and to the voltage $V_{dd\_clamp}$, and can output the higher of the two voltages as the voltage $V_{ps2}$. Notwithstanding, since the voltage $V_{dd\_clamp}$ is clamped to the voltage $V_{dd}$, as will be described, the voltage $V_{ps2}$ generally will be equal to the voltage $V_{dd}$.

As noted, when the control signal $CS_{clamp}$ indicates that the voltage $V_{cc}$Aux is to be used to generate the supply voltage $V_{gg}$, the control signal $CS_{ls1b}$ can be set low, and when the control signal $CS_{clamp}$ indicates that the voltage $V_{dd\_clamp}$ is to be used to generate the supply voltage $V_{gg}$, the control signal $CS_{ls1b}$ can be set high. When the control signal $CS_{ls1b}$ is set low, the transistor 312 can be turned off, thus turning off the voltage $V_{dd\_clamp}$.

When the control signal $CS_{ls1b}$ is set high, the transistor 312 can be turned on, thus turning on the voltage $V_{dd\_clamp}$ and activating the voltage supply system 104 as a voltage source to provide the supply voltage $V_{gg}$. In addition, the transistor 314 can be turned on. As noted, the transistor 314 can be configured as a rectifier transistor. Thus, when the transistor 314 is turned on, the transistor can pull the voltage $V_{ps2}$ up to the level of the voltage $V_{dd}$. Because the well of the transistor 312 is coupled to the voltage $V_{ps2}$, which in turn is generally equal to the voltage $V_{dd}$, the transistor 314 can pull the well of the transistor up to the voltage $V_{dd}$. In doing so, the voltage $V_{ps2}$ and the output voltage $V_{dd\_clamp}$ of the drain of the transistor 312 are both clamped to same potential as the voltage $V_{dd}$. When the control signal $CS_{ls1b}$ is set low, the transistors 312, 314 both can be turned off, thereby releasing the clamp on the voltage $V_{ps2}$ and turning off the output voltage $V_{dd\_clamp}$, thus deactivating the voltage supply system 104 from being a voltage source for the supply voltage $V_{gg}$.

Moreover, since the transistors 312, 314 are turned off when the voltage supply system 104 is deactivated, the voltage supply system 104 can be decoupled from $V_{gg}$, thus prohibiting current generated by the supply regulator 102 of FIG. 2 from feeding into the voltage supply system 104. Further, power consumed by the transistors 312, 314 can be virtually eliminated when the voltage supply system 104 is not in use, thus reducing power losses in the system.

Referring now to the system 100 of FIG. 1, the power supply regulator 102 of FIG. 2, and the voltage supply system 104 of FIG. 3, the advantages provided by implementing the capacitor 138 and the resistor 140 in the system 100 will be described.

At this point it should be noted that, in addition to the capacitance provided by the capacitor 138, the voltage driver 122 may contribute additional capacitance in the circuit comprising the voltage driver 122, the capacitor 138, the resistor 140, and the source of the bias voltage $V_{gg\_regu}$. For example, if the voltage driver 122 is embodied as a MOSFET transistor, a level of capacitance may inherently exist between the gate and the drain of the transistor. If the transistor is relatively large so as to supply a significant amount of the current $I_D$ to the IC components 108 and the current sinks (e.g., the transistors) 134, 136, the amount of capacitance between the gate and the drain of transistor 122 may be significant.

The capacitance introduced by the capacitor 138 and the voltage driver 122 can introduce a dominant pole in the complex plane representation of AC gain between the gate of the voltage driver 122 and the source of the bias voltage $V_{gg\_regu}$ (e.g., the output of the differential amplifier 204 $V_{da}$, see FIG. 2). The dominant pole can provide stability to the system including power supply regulator 102 and the voltage driver 122.

As noted, when the control signal $CS_{clamp}$ indicates that the voltage $V_{dd\_clamp}$ is to be used to generate the supply voltage $V_{gg}$, the switches 126, 128 of the transmission gate 124 can be turned off and the gate of the voltage driver 122 can be pulled up to the potential of the voltage $V_{lsps}$. Accordingly, a voltage potential can be established between the bias voltage $V_{gg\_regu}$ and the gate of the voltage driver 122. The voltage potential can be approximately equal to the voltage drop across the transistor 220, which as noted can be in the range of about 0.7V-0.8V.

The voltage potential stored in the voltage driver 122 and the capacitor 138 can be used to apply a voltage pre-bias to the power supply regulator 102 in order to pre-bias the bias voltage $V_{gg\_regu}$. When the control signal $CS_{clamp}$ changes to initiate a transition from the voltage $V_{dd\_clamp}$ to the voltage $V_{cc}$Aux, the transistor 130 can be turned off, while the switches 126, 128 in the transmission gate 124 can be turned on. This allows the voltage of the gate of the voltage driver 122 to drop more quickly to a voltage level that is above the previous voltage of $V_{gg\_regu}$. Specifically, when the transistor 130 is turned off and the switches 126, 128 are turned on, the charge stored in the voltage driver 122 and the capacitor 138 can be released to pull the level of the voltage of $V_{gg\_regu}$ up to a value that is between the previous potential of the voltage of $V_{gg\_regu}$ (e.g., $V_{cc}$Aux minus about 0.7V-0.8V) and the potential of $V_{cc}$Aux.

The differential amplifier 204 also can turn on, as described, to ramp the voltage $V_{da}$ up to the level of the voltage $V_{ref}$. A slew rate generally will be associated with the power ramp up, however, and thus the differential amplifier 204 may not ramp the voltage $V_{da}$ to the proper voltage level fast enough to ensure that the voltage driver 122 maintains the supply voltage $V_{gg}$ after the $V_{dd\_clamp}$ voltage is turned off. Since the bias voltage $V_{gg\_regu}$ is about 0.7V-0.8V below $V_{cc}$Aux when the transition is initiated, without the voltage pre-bias provided by the capacitance of the voltage driver 122 and the capacitor 138, the bias voltage $V_{gg\_regu}$ typically would not be sufficient to ensure that the supply voltage $V_{gg}$ is not interrupted during the transition. Thus, the IC components 108 that operate using the supply voltage $V_{gg}$ could be negatively affected. For example, a memory cell array could lose data stored therein.

Nonetheless, the voltage pre-bias provided by the charge can increase the bias voltage $V_{gg\_regu}$, and thus the bias voltage $V_{G1}$ applied to the gate of the voltage driver 122, to a level which is adequate to provide the desired supply voltage $V_{gg}$ until the output voltage $V_{da}$ of the differential amplifier 204 is ramped up to a level suitable for properly biasing the voltage driver 122. Accordingly, the IC components 108 that operate using the supply voltage $V_{gg}$ will not be adversely affected. For example, the present state of a memory cell array will be maintained and loss of data will not occur.

Further, the resistor can remove a zero (i.e., a zero in the equations describing the phase/gain behavior) in the circuit comprising the voltage driver 122, the capacitor 138, the resistor 140, and the source of the bias voltage $V_{gg\_regu}$, thus stabilizing the discharge of the capacitor 138 and the voltage driver 122 and providing a smooth transition from the use of the voltage $V_{dd-clamp}$ to the use of the voltage $V_{cc}$Aux to generate the supply voltage $V_{gg}$.

Moreover, since the capacitor 138 can help to suitably maintain the supply voltage $V_{gg}$ during the transition, there is not a need to turn on the voltage driver 122 prior to the voltage $V_{dd\_clamp}$ being decoupled from the supply voltage $V_{gg}$. If the voltage driver 122 were to be turned on before the $V_{dd\_clamp}$ is decoupled, current would flow from the source of the voltage $V_{cc}$Aux to the source of the voltage $V_{dd}$. Such current flow could momentarily increase the level of the voltage $V_{dd}$, and thus adversely affect other components which also may operate using the voltage $V_{dd}$.

When the control signal $CS_{clamp}$ indicates that a transition is to be implemented to change from the use of the voltage $V_{cc}$Aux to provide the supply voltage $V_{gg}$ to the use of the voltage $V_{dd\_clamp}$, the differential amplifier 204 in the power supply regulator 102 can be turned off, and the bias voltage $V_{gg\_regu}$ can be set to be about 0.7V-0.8V below the potential of the voltage $V_{cc}$Aux. In addition, the voltage supply system 104 can be turned on to supply the voltage $V_{dd\_clamp}$ as the supply voltage $V_{gg}$. Since $V_{dd}$ is generally held constant, and the slew rates of the transistors 312, 314 that provide $V_{dd\_clamp}$ are approximately the same as the slew rates of the transistors 130, 126, 128, the transition from the voltage $V_{cc}$Aux to the voltage $V_{dd\_clamp}$ can be implemented without adversely affecting the supply voltage $V_{gg}$. Hence, the IC components 108 that operate using the supply voltage $V_{gg}$ will not be adversely affected. By way of example, the present state of a memory cell array will be maintained, thereby preventing any loss of data.

Figure 4:
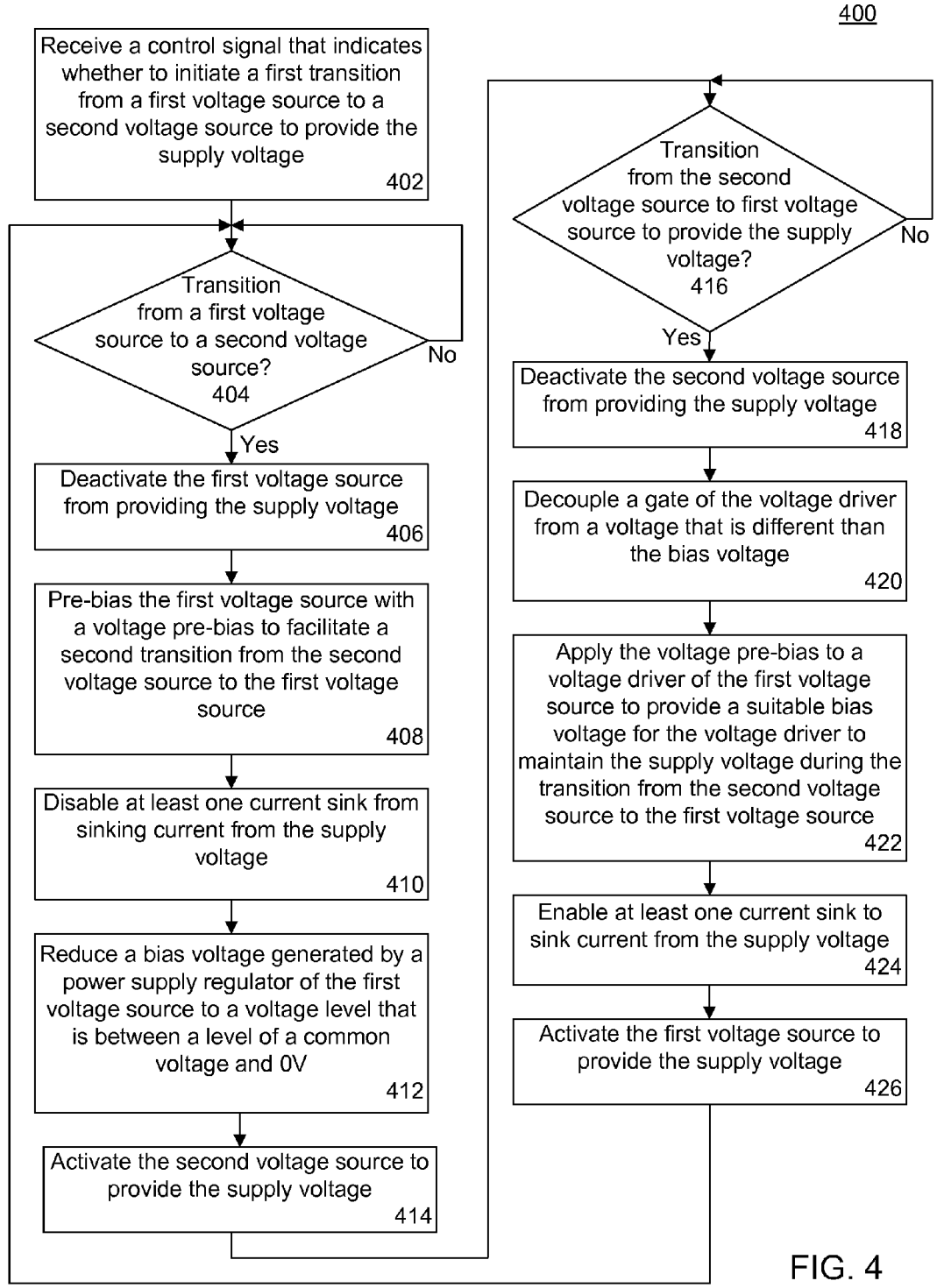
FIG. 4 is a flowchart illustrating a method of synchronizing a transition between voltage sources that are used to provide a supply voltage in accordance with another embodiment of the present invention.

FIG. 4 is a flowchart illustrating a method 400 of synchronizing a transition between voltage sources that are used to provide a supply voltage in accordance with another embodiment of the present invention. At step 402 a control signal can be received. The control signal can indicate whether to initiate a first transition from a first voltage source to a second voltage source to provide the supply voltage.

Referring to decision box 404, when the control signal indicates to initiate a first transition from a first voltage source to a second voltage source to provide the supply voltage, at step 406 the first voltage source can be deactivated from providing the supply voltage. In illustration, a voltage driver of the first voltage source can be turned off. For example, a gate of the voltage driver can be decoupled from a bias voltage and coupled to a voltage that is different from the bias voltage. If the control signal does not indicate to initiate the first transition from the first voltage source to the second voltage source to provide the supply voltage, the process waits for such indication.

At step 408, the first voltage source can be pre-biased with a voltage pre-bias to facilitate a second transition from the second voltage source to the first voltage source. At step 410, at least one current sink can be disabled from sinking current from the supply voltage.

At step 412, a bias voltage generated by a power supply regulator of the first voltage source can be reduced to a voltage level that is between a level of a common voltage and 0V. For example, the bias voltage can be reduced to a voltage level that is equal to the level of the common voltage minus a voltage that is approximately equal to a voltage drop across a diode. At step 414, the second voltage source can be activated to provide the supply voltage. The process then can proceed to decision box 416.

Referring to decision box 416, when the control signal indicates to initiate a second transition from the second voltage source to the first voltage source to provide the supply voltage, at step 418 the second voltage source can be deactivated from providing the supply voltage. In illustration, a voltage driver of the second voltage source can be turned off. For example, a gate of the voltage driver can be decoupled from a voltage that is different from the bias voltage and coupled to the bias voltage. If the control signal does not indicate to initiate the second transition from the second voltage source to the first voltage source to provide the supply voltage, the process waits for such indication.

At step 420, a gate of the voltage driver can be decoupled from a voltage that is different from the bias voltage. At step 422, the voltage pre-bias can be applied to a voltage driver of the first voltage source to provide a suitable bias voltage for the voltage driver to maintain the supply voltage during the transition from the second voltage source to the first voltage source. At step 424, at least one current sink can be enabled to sink current from the supply voltage. At step 426, the first voltage source can be activated to provide the supply voltage. The process then can return to decision box 404 and continue until the system is powered down.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of generating a power supply voltage, the method comprising:
   receiving a control signal that indicates which of a first voltage source and a second voltage source provides the power supply voltage;
   in response to the control signal indicating the second voltage source provides the power supply voltage:
      deactivating the first voltage source from providing the power supply voltage,
      pre-biasing the first voltage source with a voltage pre-bias to facilitate each transition from the second voltage source to the first voltage source, and
      activating the second voltage source to provide the power supply voltage; and
   in response to the control signal indicating the first voltage source provides the power supply voltage:
      deactivating the second voltage source from providing the power supply voltage,
      generating a bias voltage that amplifies a difference between a reference voltage and the power supply voltage, wherein at the transition the bias voltage ramps from the voltage pre-bias, and
      activating the first voltage source to provide the power supply voltage, including applying the voltage pre-bias to a voltage driver of the first voltage source to maintain the power supply voltage during the transition.

2. The method of claim 1, wherein the deactivating the first voltage source from providing the power supply voltage comprises:
   turning off the voltage driver of the first voltage source.

3. The method of claim 2, wherein the turning off the voltage driver of the first voltage source comprises:
   decoupling a gate of the voltage driver from a the bias voltage; and
   coupling the gate of the voltage driver to a voltage that is different from the bias voltage.

4. The method of claim 1, wherein the pre-biasing the first voltage source comprises storing the voltage pre-bias within a capacitive element coupled between the power supply voltage and the bias voltage.

5. The method of claim 1, wherein the pre-biasing the first voltage source includes:
   reducing the bias voltage generated by a power supply regulator of the first voltage source to a voltage level that is between a supply voltage and 0V.

6. The method of claim 5, wherein the reducing the bias voltage generated by the power supply regulator comprises: reducing the bias voltage to the voltage level that is equal to the supply voltage minus a voltage drop across a transistor configured as a diode.

7. The method of claim 1, wherein the deactivating the first voltage source from providing the power supply voltage includes
   decoupling a gate of the voltage driver from the bias voltage and coupling the gate of the voltage driver to a voltage that is higher than the bias voltage.

8. The method of claim 1,
   wherein the activating the first voltage source in response to the control signal includes enabling at least one current sink to sink current from the power supply voltage in response to the control signal indicating the first voltage source provides the power supply voltage, the current maintaining a current provided by the voltage driver within a range that maintains a tolerance of the power supply voltage; and
   wherein the deactivating the first voltage source in response to the control signal includes disabling the at least one current sink in response to the control signal indicating the second voltage source provides the power supply voltage.

9. A system for generating a power supply voltage controlled by a control signal, comprising:
   a first voltage source including:
      a power supply regulator generating a bias voltage;
      a voltage driver;
      a transmission gate; and
      a capacitive element; and
   a second voltage source;
   wherein:
   in response to the control signal indicating the second voltage source provides the power supply voltage:
      the transmission gate decouples the bias voltage from the voltage driver;
      the voltage driver deactivates the first voltage source from providing the power supply voltage;
      the power supply regulator pre-biases the bias voltage to a voltage pre-bias stored within the capacitive element to facilitate each transition from the second voltage source to the first voltage source; and
      the second voltage source is activated to provide the power supply voltage; and
   in response to the control signal indicating the first voltage source provides the power supply voltage:
      the second voltage source is deactivated from providing the power supply voltage;
      the voltage driver activates the first voltage source to provide the power supply voltage;
      the transmission gate applies the voltage pre-bias from the capacitive element to the voltage driver to maintain the power supply voltage during the transition, and the transmission gate couples the bias voltage to the voltage driver; and
      the power supply regulator generates the bias voltage that amplifies a difference between a reference voltage and the power supply voltage.

10. The system of claim 9, wherein:
    the voltage driver turns off to deactivates the first voltage source from providing the power supply voltage in response to the transmission gate decoupling the bias voltage from the voltage driver.

11. The system of claim 10, further comprising:
    a switch that, in response to the control signal indicating the second voltage source provides the power supply voltage, couples a gate of the voltage driver to a voltage that is different from the bias voltage;

wherein the voltage driver turns off in response to the transmission gate decoupling the gate of the voltage driver from the bias voltage and the switch coupling the gate of the voltage driver to the voltage that is different from the bias voltage.

12. The system of claim 9, further comprising:
at least one current sink;
at least one switch, wherein:
in response to the control signal indicating the first voltage source provides the power supply voltage, the at least one switch enables the at least one current sink to sink current from the power supply voltage, the current maintaining a current provided by the voltage driver within a range that maintains a tolerance of the power supply voltage; and
in response to the control signal indicating the second voltage source provides the power supply voltage, the at least one switch disables the at least one current sink from sinking current from the power supply voltage.

13. The system of claim 9, wherein the power supply regulator of the first voltage source comprises:
a differential amplifier that amplifies the difference between the reference voltage and the power supply voltage, wherein the differential amplifier turns on in response to the control signal indicating the first voltage source provides the power supply voltage, and the differential amplifier turns off in response to the control signal indicating the second voltage source provides the power supply voltage; and
a voltage divider network that, in response to the control signal indicating the second voltage source provides the power supply voltage, reduces the bias voltage generated by the power supply regulator to a voltage level that is between a supply voltage and 0V.

14. The system of claim 13, wherein:
the voltage divider network reduces the bias voltage to the voltage level that is equal to the supply voltage minus a voltage drop across a transistor configured as a diode.

15. The system of claim 11, wherein the switch, in response to the control signal indicating the first voltage source provides the power supply voltage, decouples the gate of the voltage driver from the voltage that is different from the bias voltage.

16. A system for generating a power supply voltage controlled by a control signal, comprising:
a first voltage source including:
a power supply regulator generating a bias voltage;
a voltage driver; and
a transmission gate; and
a second voltage source;
wherein:
in response to the control signal indicating the second voltage source provides the power supply voltage:
the transmission gate decouples the bias voltage from the voltage driver;
the voltage driver deactivates the first voltage source from providing the power supply voltage;
the power supply regulator pre-biases the bias voltage to a voltage pre-bias to facilitate each transition from the second voltage source to the first voltage source; and
the second voltage source is activated to provide the power supply voltage; and
in response to the control signal indicating the first voltage source provides the power supply voltage:
the second voltage source is deactivated from providing the power supply voltage;
the voltage driver activates the first voltage source to provide the power supply voltage;
the transmissions gate applies the voltage pre-bias to the voltage driver to maintain the power supply voltage during the transition from the second voltage source to the first voltage source, and the transmission gate couples the bias voltage to the voltage driver; and
the power supply regulator generates the bias voltage that amplifies a difference between a reference voltage and the power supply voltage.

17. The system of claim 16, wherein the first voltage source further includes:
a capacitive element coupled between the power supply voltage and the bias voltage of the power supply regulator, wherein the capacitive element is configured to store the voltage pre-bias.

18. The system of claim 16, wherein the power supply regulator of the first voltage source includes:
a differential amplifier, wherein, in response to the control signal indicating the first voltage source provides the power supply voltage, the differential amplifier turns on and generates the bias voltage that amplifies the difference between the reference voltage and the power supply voltage, and, in response to the control signal indicating the second voltage source provides the power supply, the differential amplifier turns off; and
a voltage divider network that, in response to the control signal indicating the second voltage source provides the power supply voltage, pre-biases the bias voltage with the voltage pre-bias.

19. The system of claim 16, wherein the power supply regulator of the first voltage source ramps the bias voltage from the voltage pre-bias at each transition from the second voltage source to the first voltage source.

20. The system of claim 16, further comprising a memory cell array, wherein the first voltage source provides the power supply voltage to the memory cell array during normal operation, and the second voltage source provides the power supply voltage to the memory cell array during a power saving mode.

* * * * *